Oct. 10, 1939.   C. V. DICKERSON   2,175,684
DIFFERENTIAL
Original Filed July 15, 1935   2 Sheets-Sheet 1
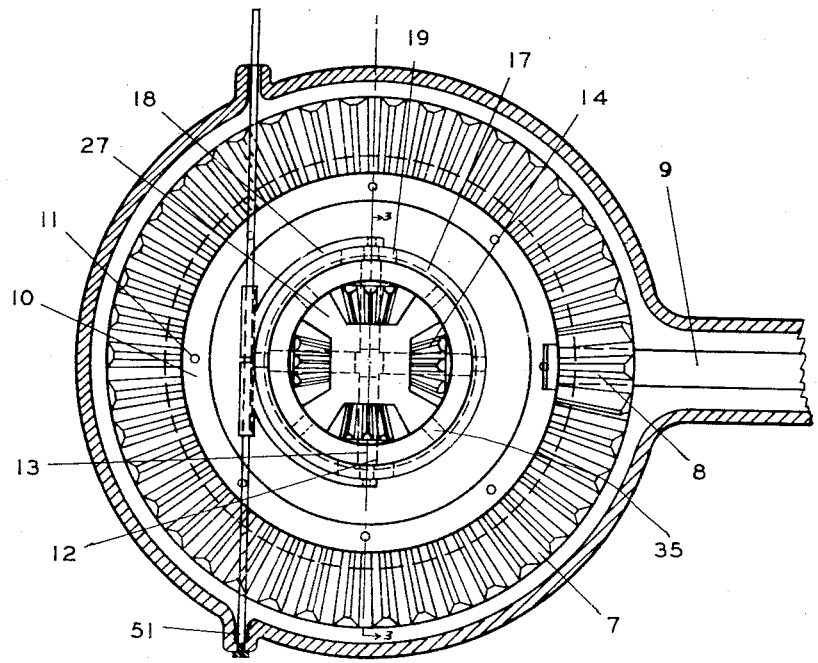
FIG. II
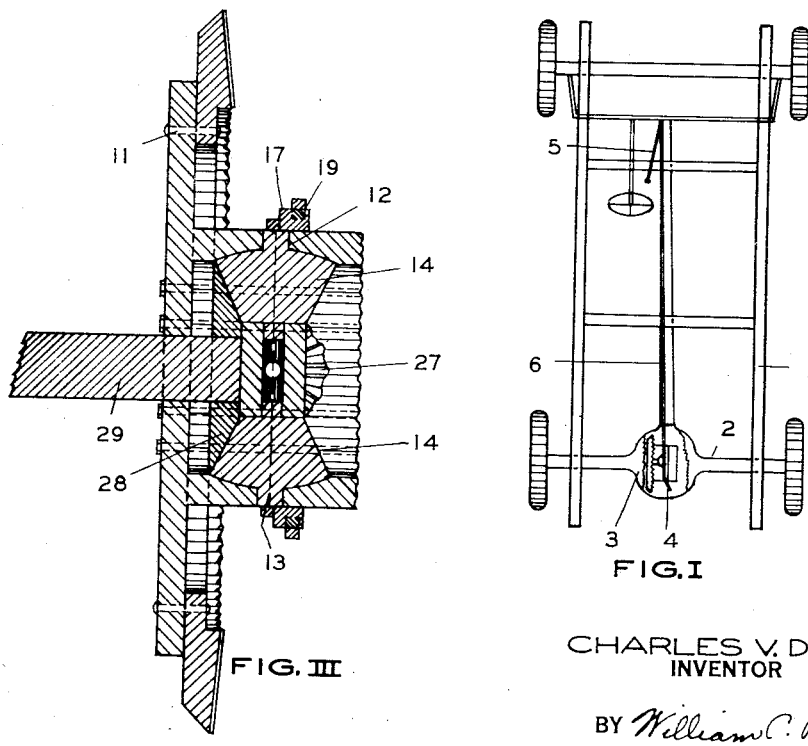
FIG. III   FIG. I
CHARLES V. DICKERSON
INVENTOR
BY *William C. Rogers*
ATTORNEY Oct. 10, 1939.   C. V. DICKERSON   2,175,684
DIFFERENTIAL
Original Filed July 15, 1935   2 Sheets-Sheet 2
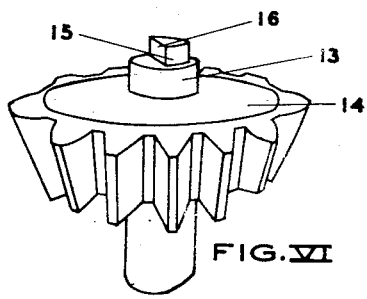
FIG. VI
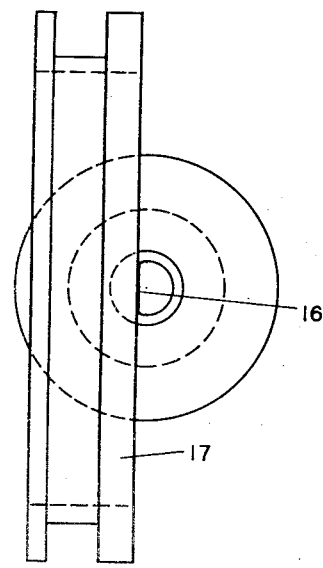
FIG. IV
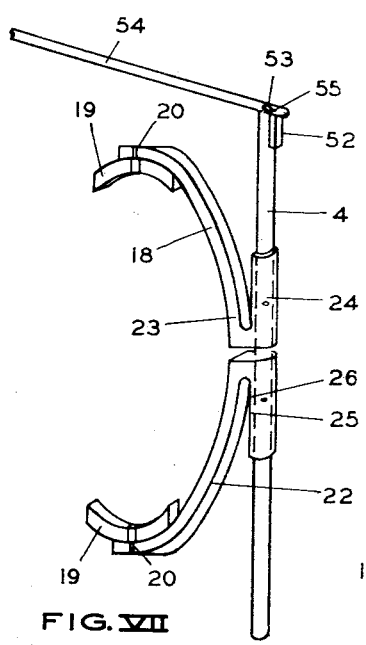
FIG. VII
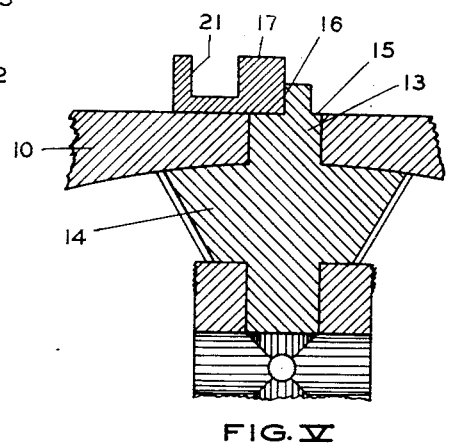
FIG. V
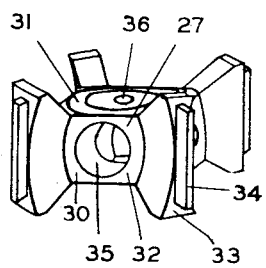
FIG. VIII
CHARLES V. DICKERSON
INVENTOR
BY William C. Rogers
ATTORNEY Patented Oct. 10, 1939

2,175,684

UNITED STATES PATENT OFFICE 2,175,684

DIFFERENTIAL

Charles V. Dickerson, Schenectady, N. Y.

Application July 15, 1935, Serial No. 31,483
Renewed March 1, 1939

2 Claims. (Cl. 74—316)

This invention relates to differential for automobiles and other machines wherein a differential action may be necessary for proper transmission of power.

It is the main purpose of this invention to provide a modified differential for automobiles and the like in which the operator can at will change from a differential action to a direct drive from power unit to wheels.

While the great advantages of differentials on automobiles has long been known and their application to vehicles was and will always be considered as a great step in the development of motor cars, yet there are times when this differential action acts as a detriment to the proper driving of an automobile.

When one automobile wheel is in a soft muddy place or resting on any slippery surface, the car can be started easier with a straight drive than with a drive through a differential.

Also a straight drive is more economical on a straight-away than a drive through a differential as there will be less power lost due to excess spinning of one wheel because of slippery or uneven surfaces.

Further an even drive can be had on a wet or ice covered hill and with proper tires, the use of a direct drive will eliminate the necessities of using chains.

Therefore, in order to give the operator of a motor vehicle the advantages of a direct drive as well as the obvious advantages of a differential drive, it is the main object of this invention to provide a modified differential which can be instantly changed from a differential drive to a direct drive or from direct to differential drive.

It is a particular object of this invention to provide an automobile differential wherein the differential pinions can be locked against rotation by the operator.

It is a further particular object of this invention to provide a differential with modified differential pinions which are operated upon by a collar to lock them against the rotation in one position of the collar and to permit them to rotate when the collar is in another position.

It is a still further object of this invention to provide a collar about the automobile differential casing which is actuated by a yoke and series of levers to move against and away from flattened ends of the differential pinion shafts to lock or release the differential pinions.

These and other objects of this invention will be apparent from the following description and appended claims.

This invention in a preferred form is shown in the accompanying drawings and hereinafter more fully described.

On the drawings:

Figure I is a diagrammatic view of an automobile frame showing the rods connecting the modified differential of my invention to the operating lever.

Figure II is a fragmentary end elevation of a differential modified in accordance with this invention and with the right rear axle shaft and pinion removed to more clearly show the parts.

Figure III is a sectional view taken on the line 3—3 of Figure II.

Figure IV is an elevational view of the collar shown in Figures II and III in operative relation to one of the differential pinions.

Figure V is an enlarged fragmentary sectional view showing the pinion and collar taken along the line 3—3 of Figure II.

Figure VI is an isometric view of a differential pinion modified according to this invention.

Figure VII is an isometric view of the yoke; and

Figure VIII is an isometric view of a spider used to properly space the differential pinions.

As shown on the drawings:

The numeral 1 in Figure I indicates the frame of an automobile. 2 is the rear axle carrying the differential 3 having a rod 4 extending upwardly therefrom and connected to and operating lever 5 by shafting 6.

In Figure II the usual ring gear or drive gear 7 is shown in operative relation to the driving pinion 8 on shaft 9. The ring gear 7 shown is of the bevel type but may be of the spiral bevel type if desired.

The differential case 10 is connected to ring gear 7 by bolts 11 in the usual manner and is provided with openings 12 for receiving the shafts 13 of differential pinions 14 (Figure III).

The differential pinion 14 as shown in detail in Figures V and VI differs from the ordinary differential pinions now in use in that the pinion 14 is integral with the shaft 13 so as to have the shaft 13 rotate therewith. It is to be understood that the pinion 14 and shaft 13 may be keyed to each other or attached in any other manner so that as the pinion 14 rotates it causes the shaft 13 to rotate with it.

The end of the pinion shaft 13 extending beyond the casing 10 is reduced as shown at 15 and one side of this reduced portion 15 is flattened as indicated by the numeral 16.

Encircling the case 10 adjacent the pinion shafts 13 is a collar 17. This collar 17 is free to move on the casing 10 but its movement is controlled by a yoke 18 having swivel pieces 19 pivotally connected thereto at 20. These swivel members 19 ride in a groove 21 provided in the collar 17.

The yoke 18 has two arms 22 and 23 and each of these arms has a cylindrical piece 24 at the end thereof distant from the swivel member 19. The bore of each cylindrical piece has a key 25. Rod 4 extends through the cylindrical pieces and is provided with a recess 26 into which the key 25 fits so that the rotation of the rod 4 causes the yoke 18 to move back and forth relative to the pinion shafts 13. The swivel pieces 19, which ride in the groove 21 of the collar 17, forces the collar to move back and forth with the yoke 18.

The lower end of the rod 4 is received in a socket 51 in the differential housing 3. The upper end of rod 4 is keyed as at 52 and receives the bored end 53 of an arm 54 which is pivotally attached to the shafting 6. The bore 53 of arm 54 has a keyway 55 to receive the key 52.

Figure VIII shows a spider 27 which spaces the differential pinions 12 and holds them in place. The spider 27 also serves to space the differential gears one of which is shown at 28 attached to the axle shaft 29 in Figure III and further acts as a bearing for the differential pinions. The spider 27 has a substantially rectangular body 30 against the flat faces 31 of which the differential gears 28 abut and against the side faces 32 of which the differential pinions 12 abut. The spider 27 has ears 33 fitted with keys 34 which extend from the corners of the body 30 and which fit into complementary recesses 35 in the differential case 10 (Figure II). This spider 27 serves to hold all the parts of the differential in proper relation to each other. The ears 33 have conical faces to provide for proper clearance of the pinions 14.

Holes 35 are bored through the faces 32 of the spider 27 to receive the pinion shafts 13. Hole 36 is an oil hole. The faces of the pinions and differential gears rest against the faces of the spider.

The operation of the differential of my invention is as follows. In the ordinary driving of the car to which it is attached, the lever 5 is shifted forward so that through the leverage connecting it to the collar 17, the collar 17 is kept away from the pinion shafts 13. With this setup, the differential acts in the ordinary manner. If one of the rear wheels loses traction it will spin and the outer wheel will be permitted to move faster in rounding a turn.

However, if it desired to prevent a wheel from spinning, the collar 17 can, by action of the lever 5, be moved into engagement with the flattened faces 16 of the pinion shafts 13. The lever 5 draws shafting 6 which in turn pulls lever 54 and rotates rod 4. As rod 4 is rotated, it causes the yoke 18, which is keyed to it, to move angularly. The end pieces 19 in the groove 21 of the collar 17 cause the collar to move along the casing 10.

The collar is thus forced against the flattened faces 16 of the shafts 13 and binds them against rotation. As the pinions are rigidly attached to the shafts, they, in turn, are prevented from rotating. Thus, the drive to each wheel is equalized.

Many changes may be made in the detail of construction, in particular clearance grooves may be made in the faces of the spider, without departing from the spirit of this invention.

The lever 5 and shafting 6 are merely shown as one way of controlling the action of the collar from the driver's seat. It is to be understood that other control means may be used.

It is preferable to use a nickle steel for the collar 17 and some hard alloy steel such as manganese steel for the gears, but the particular materials of construction are not any specific part of this invention.

Such changes as above mentioned are contemplated and covered in the following claims.

I claim as my invention:

1. In a selective locking device for differentials for automobiles, a differential casing, differential gears within said casing, differential pinions meshing with said gears integrally mounted on shafts journalled in and extending through said casing, the extending portions of said shafts having flattened faces, a movable collar for contacting said faces on the ends of the shafts to prevent rotation of the pinions and a spider member in said casing having a body portion with faces adjacent the pinion gears and having arms extending therefrom, the spider having openings on the faces thereof for receiving the pinion shafts, said arms having reduced end portions which fit into openings in said casing and shoulders abutting against the inner face of the casing to hold the spider firmly in place, said spider being so proportioned as to hold the pinions in bearing relation with its faces and the inner face of the housing.

2. In a selective locking device for differentials for automobiles, a differential casing, differential gears within said casing, differential bevel pinions meshing with said gears integrally mounted on shafts journalled in and extending through said casing, the extending portions of said shafts having flattened faces, a movable collar for contacting said faces to prevent rotation of the pinions and a spider member in said casing having faces with openings receiving the pinion shafts thereby giving a bearing for the shafts and having arms extending radially therefrom between the pinions, said arms having reduced end portions received in apertures in the casing, shoulders formed thereby abutting the casing and concave conical faces between which the pinions rotate, said spider being so proportioned that the body thereof and the arms thereof form with the casing, wells just sufficiently large to receive the bevel pinions.

CHARLES V. DICKERSON.